United States Patent
Tanaka

[11] Patent Number: 5,929,361
[45] Date of Patent: Jul. 27, 1999

[54] WOODWIND-STYLED ELECTRONIC MUSICAL INSTRUMENT WITH BITE INDICATOR

[75] Inventor: So Tanaka, Hamamatsu, Japan

[73] Assignee: Yamaha Corporation, Hamamatsu, Japan

[21] Appl. No.: 09/151,906

[22] Filed: Sep. 11, 1998

[30] Foreign Application Priority Data

Sep. 12, 1997 [JP] Japan .................................. 9-265095

[51] Int. Cl.⁶ .............................. G09B 15/04; G10D 7/00; G10H 1/18; G10H 3/12
[52] U.S. Cl. ............................ 84/742; 84/743; 84/380 R; 84/453; 84/478
[58] Field of Search ..................... 84/615–620, 626–633, 84/653–658, 662–665, 644, 670, 678–690, 701–711, 718, 723–743, 453, 477 R, 478, 380 R–385 R

[56] References Cited

U.S. PATENT DOCUMENTS 5,300,729   4/1994   Tokunaga et al. .

5,403,966   4/1995   Kawashima et al. .

*Primary Examiner*—Stanley J. Witkowski
*Attorney, Agent, or Firm*—Graham & James LLP

[57] ABSTRACT

A woodwind-styled electronic musical instrument comprises an instrument body of an elongated rod shape provided with a plurality of manipulating note keys arranged thereon for designating musical notes to be played, and a mouthpiece arranged at the top end of the instrument body and including a lip sensor for detecting a bite condition of the player. Musical tones are produced according to the designation by the note keys and to the bite condition. On the front surface of the instrument body in the slope area near the top end thereof are arranged a first and second LED'S. In a tight-lip control condition, the bite condition is detected to be neutral level when the lip sensor detects a middle extent of the bite degree, while in a loose-lip control condition, the bite condition is detected to be neutral level when the lip sensor detects a substantially zero extent of the bite degree. In either control condition, the first LED is not lit at and near the neutral level, and is lit neither at nor near the neutral level. The second LED is lit when the breath pressure is good for the tone production.

5 Claims, 10 Drawing Sheets

WOODWIND-STYLED ELECTRONIC MUSICAL INSTRUMENT WITH BITE INDICATOR

BACKGROUND OF THE INVENTION

1. Field of the Invention

The present invention relates to an electronic musical instrument having the style of a woodwind musical instrument and being played in the manner similar to that of playing a woodwind musical instrument.

2. Description of the Prior Art

Among electronic musical instruments, the most popular ones are keyboard type electronic musical instruments, and recently developed and put into practical use are woodwind-styled electronic musical instruments which exhibit shapes similar to acoustic woodwind musical instruments and are played in a similar manner, and are suitable for producing musical tones which are very much like the tones of the acoustic wind instruments. Such a woodwind-styled electronic musical instrument typically comprises an instrument body of a generally rod-like shape provided with a plurality of note designating keys arranged on the front surface thereof and a mouthpiece incorporating a wind sensor for detecting the breath pressure applied into the mouthpiece and a lip sensor for detecting the bite degree (condition) applied onto the mouthpiece.

Among conventional woodwind-styled electronic musical instrument, such a type of instruments have been known that comprises a seven-segment indicator device for numerically indicating the detected value of the wind sensor or the lip sensor. The numerical indication by the indicator is useful for adjusting the threshold strength of the breath pressure to be detected by the wind sensor for the instrument to produce a musical sound when the breath pressure is above the threshold strength, or for adjusting the neutral (standard) level of the bite strength to be detected by the lip sensor for the control of produced sounds. The instrument player sees the indicated values and adjust his/her manipulation of the instrument. But the trouble may be such that the player does not readily understand the meaning of the values. For example, in the case of the control pattern of "tight lip" (to be explained hereinafter with reference to the Figures), the performance is conducted by setting the neutral bite level to be the bite condition of the lip sensor where the lip sensor is bitten (pressed) by the lip to a certain extent. But the above-mentioned numerical indication will not be intuitively understandable to know the neutral level of bite, and thus the adjustment of the player's bite strength will not be facilitated greatly even with the indicator equipped.

SUMMARY OF THE INVENTION

It is, therefore, a primary object of the present invention to provide a woodwind-styled electronic musical instrument comprising an instrument body arranged with a plurality of note designating keys and a mouthpiece arranged with a lip sensor for detecting the degree of lip bite so improved that the bite condition of the lip sensor is readily and intuitively understandable at a glance by the player during playing on the instrument.

In order to accomplish the abovementioned and other objects, an electronic musical instrument of a woodwind style in one aspect of the present invention comprises an instrument body provided with a plurality of manipulating note keys arranged thereon for generating note designating information which designates musical notes to be played, a mouthpiece arranged at the top end of the instrument body and provided with a bite manipulator for receiving a bite condition of the player and generating bite information, a bite indicator for indicating a bite condition of the bite manipulator as operated by the instrument player, a musical tone control signal generator for generating a signal which controls production of a musical tone at least in accordance with the note designating information and the bite information, and a bite indicator control device which controls the bite indicator to exhibit a first indication state when the bite manipulator is manipulated to or in the vicinity of a neutral level which is a middle extent of the bite degree of the bite manipulator, and to exhibit a second indication state when the bite manipulator is manipulated to a level which is neither the neutral level nor the vicinity thereof. The first indication state is preferably a state where the bite indicator is not lit while the second indication state is preferably a state where the bite indicator is lit. The control rate at which the musical tone control signal controls production of a musical tone in accordance with the bite information is selectable. With this arrangement, the player can readily and intuitively recognize the neutral bite level which is a bite degree of the middle extent and the vicinity of the neutral bite level from the indication pattern of the indicator.

According to another aspect of the present invention, an electronic musical instrument of a woodwind style comprises an instrument body provided with a plurality of manipulating note keys arranged thereon for generating note designating information which designates musical notes to be played, a mouthpiece arranged at the top end of the instrument body and provided with a bite manipulator for receiving a bite condition of the player and generating bite information, a bite indicator for indicating a bite condition of the bite manipulator as operated by the instrument player, a musical tone control signal generator for generating a signal which controls production of a musical tone at least in accordance with the note designating information and the bite information, an indicator control condition setting device capable of setting at least a first and a second control condition, the first control condition being that the bite information is to exhibit a neutral level when the bite manipulator is manipulated to a middle extent of the bite degree and the second control condition being that the bite information is to exhibit a neutral level when the bite manipulator is manipulated to a substantially zero extent of the bite degree, and a bite indicator control device which controls the bite indicator to exhibit a first indication state when the bite information exhibits the neutral level or the vicinity thereof, and to exhibit a second indication state when the bite information exhibits neither the neutral level nor the vicinity thereof. With this instrument, the player can selectively use a first control mode in which the bite information is outputted with the neutral bite level set at the middle degree of bite strength or a second control mode in which the bite information is outputted with the neutral bite level set at the non-bite state, and can easily recognize at a glance the neutral bite level and its vicinity from the indication pattern by the indicator.

According to further aspect of the present invention, an electronic musical instrument of a woodwind style comprises an instrument body provided with a plurality of manipulating note keys arranged thereon for generating note designating information which designates musical notes to be played, a mouthpiece arranged at the top end of the instrument body and provided with a bite manipulator for receiving a bite condition of the player and generating bite information, a bite indicator for indicating a bite condition of the bite manipulator as operated by the instrument player, a musical tone control signal generator for generating a signal which controls production of a musical tone at least in accordance with the note designating information and the bite information, and a bite indicator control device which controls the bite indicator to exhibit a first indication state when the bite manipulator is manipulated to or in the vicinity of a neutral level which is a non-bite degree or substantially zero extent of the bite degree of the bite manipulator, and to exhibit a second indication state when the bite manipulator is manipulated to a level which is neither the neutral level nor the vicinity thereof. The musical tone control signal controls production of a musical tone in accordance with the bite information at a selectable control rate.

BRIEF DESCRIPTION OF THE DRAWINGS

For a better understanding of the present invention, and to show how the same may be practiced and will work, reference will now be made, by way of example, to the accompanying drawings, in which.

DESCRIPTION OF THE PREFERRED EMBODIMENTS

Figure 1A:
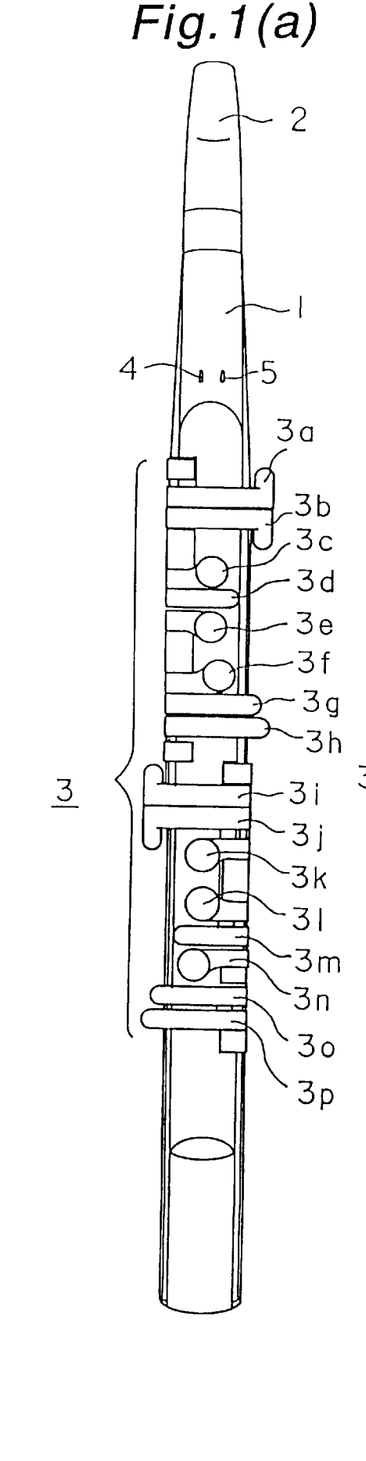
FIGS. 1(a) and 1(b) are a front view and a side view showing a configuration of an embodiment of an electronic musical instrument of a woodwind style according to this invention.
Figure 1B:
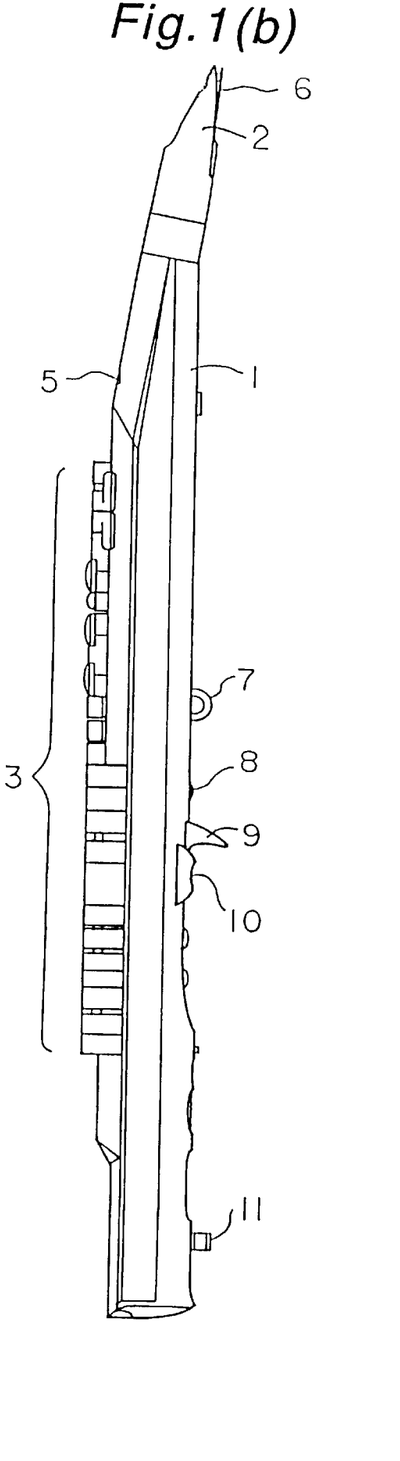
Figure 2:
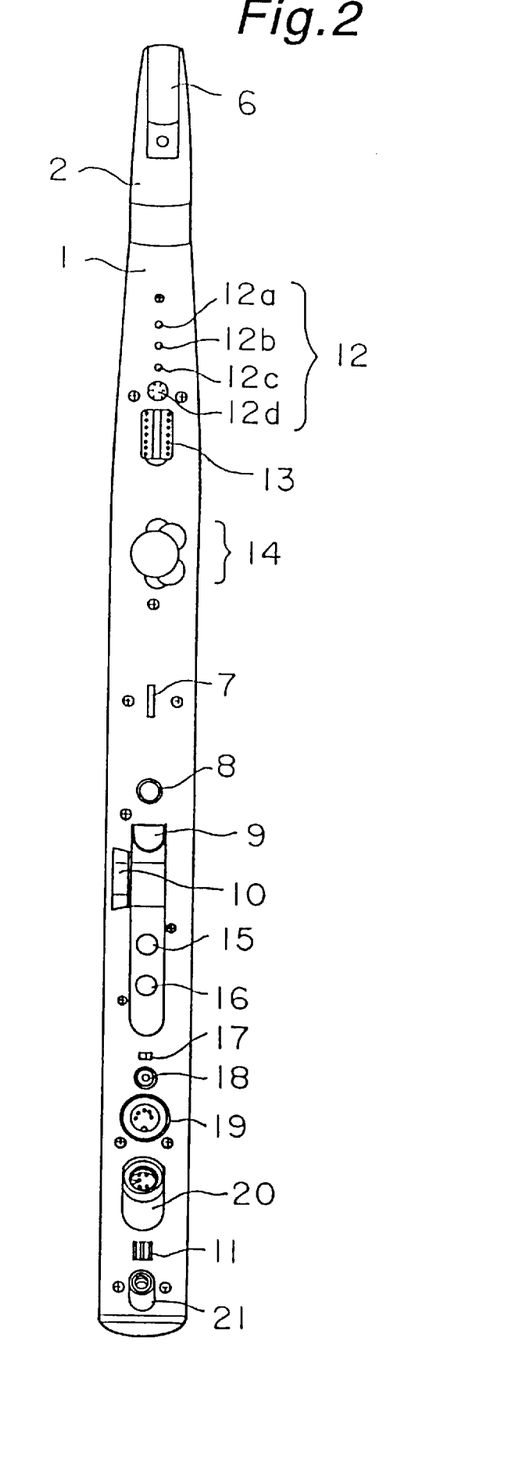
FIG. 2 is a rear view showing a configuration of the same embodiment of this invention.
Figure 3:
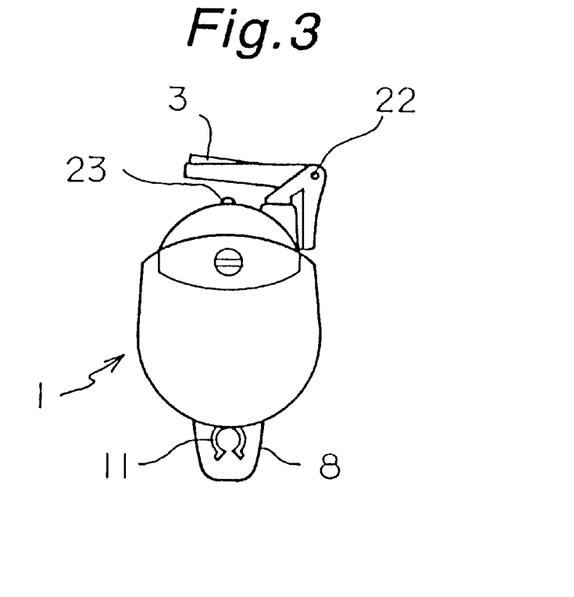
FIG. 3 is a bottom view of the same embodiment of this invention.
Figure 4:
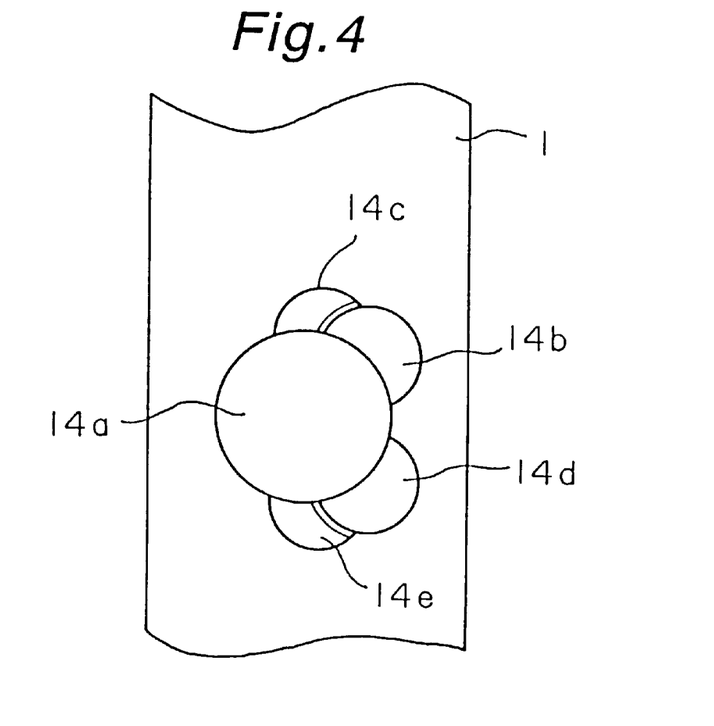
FIG. 4 is an enlarged partial rear view of FIG. 2, showing octave designating switches.

Illustrated in FIGS. 1 through 3 of the drawings show the external appearance of an embodiment of an electronic musical instrument of a woodwind style according to this invention, in which FIG. 1(a) is a front view, FIG. 1(b) a right side view, FIG. 2 a rear view and FIG. 3 a bottom view. FIG. 4 is an enlarged partial rear view around the octave designating switches.

The embodiment of an electronic musical instrument of a woodwind style according to this invention comprises, as illustrated in FIGS. 1(a) and 1(b), an instrument body 1, a mouthpiece 2, key switches 3 (including note designating keys 3a–3p), a first LED 4, a second LED 5, a lip sensor 6, a strap ring 7, a setup switch 8, a thumb rest 9, a pitch bend wheel 10 and a cable clamp 11. The embodiment instrument further comprises, as shown in FIG. 2, setting controls 12 (including 12a–12d), DIP switches 13, octave designating key switches 14, a key hold switch 15, a program change switch 16, a power switch 17, a power jack 18, a MIDI output terminal 19, WX output terminal 20 and a breath drain 21. The embodiment still further comprises, as shown in FIG. 3, a key shaft 22 and a key rod 23. FIG. 4 shows a portion around the octave designating switches 14 in FIG. 2, and illustrates a thumb rest 14a, octave shift-up switches 14b and 14c, and octave shift-down switches 14d and 14e.

As shown in FIG. 1(a), the instrument body 1 of an electronic musical instrument of this embodiment is of an elongated rod shape and is provided with a plurality of key switches 3a–3p on the front surface thereof, and the mouthpiece 2 is provided with the lip sensor 6 of which the reed portion is depicted in FIGS. 1(b) and 2, and with a wind sensor (breath sensor) inside thereof (although not depicted in these Figures). The lip sensor 6 is to detect the bite condition (degree) at the reed area and the wind sensor is to detect the breath pressure applied into the mouthpiece 2. The upper front portion of the instrument body 1 is configured in a slope shape continuing to the front surface of the mouthpiece 2 as shown in FIG. 1(b), and is provided with the #1-LED (light emitting diode) 4 and the #2-LED 5. The player of the instrument can recognize the manipulating conditions of the lip sensor 6 and the wind sensor by way of the lighting or extinguishing state of these LED's 4 and 5.

There are, for example, two patterns of control manners with the lip sensor. One is a tight lip control in which the performance is conducted by continuously pressing the reed by the lip (i.e. lower lip) and the sound production is controlled around the bite strength of a middle degree, which is defined as a neutral bite level and outputs a neutral (reference) value signal. The other is a loose lip control in which the performance is conducted by occasionally pressing the reed by the lip and the sound production is controlled by setting a neutral bite level at the non-bite state (zero degree of bite).

In the tight lip control pattern, the manipulation information to be outputted for the control of sound production is of such a characteristic that the neutral position is set at a middle level of the bite strength detected by the lip sensor. And in this pattern, the #1-LED 4 is in its extinguished state when the detected bite level is at or in the vicinity of the neutral position as defined by the middle bite strength whereas the #1-LED 4 is in its lit state when the detected bite level is at any other positions.

In the loose lip control pattern, the manipulation information to be outputted for the control of sound production is of such a characteristic that the neutral position is set at the zero level (non-bite state) of the bite strength detected by the lip sensor. And in this pattern, the #1-LED 4 is in its extinguished state when the detected bite level is at or in the vicinity of the neutral position as defined by the zero bite strength (non-bite state), whereas the #1-LED 4 is in its lit state when the detected bite level is at any other positions than the neutral region.

The #2-LED 5 is to indicate the manipulation condition of the wind sensor, and therefore the #2-LED 5 is extinguished when the breath pressure does not reach the basic strength necessary for the sound production control and is lit when the breath pressure has reached (is at or above) the basic strength necessary for the sound production control.

The explanation will be first made on the entire structure of the woodwind-styled electronic musical instrument of this embodiment with reference to FIGS. 1(a) through 5, and thereafter on the specific operation of the indicators exhibiting the manipulation condition of the lip sensor with reference to flowcharts in FIGS. 6 through 10.

In FIG. 1(a), among the note designating key switches 3 arranged on the front surface of the instrument body 1, those referencemans 3a–3h are for the left finger manipulation, being arranged nearer to the mouthpiece 2, and those referenced as 3i–3p are for the right finger manipulation, being arranged nearer to the tail end of the instrument body 1. On the rear surface of the instrument body 1, near the central position on the longitudinal center axis thereof, there is provided a thumb rest 9 protruding from the rear surface to be hooked by the right thumb for supporting the body 1 and a pitch bend wheel near the thumb rest 9 but a little bit deviated therefrom toward the tail end of the instrument and toward left in the transverse direction, as shown in FIGS. 1(b) and 2. The pitch bend wheel 10 is a rotary type variable resister with a spring bias to return to the center position of control. The manipulating portion of the pitch bend wheel 10 has an arcuate external surface with a recess position at the center of the surface when the wheel is returned to the center position by the bias spring. The wheel 10 is operated by the inside surface of the right thumb and is moved back and forth along the direction of the center axis of the instrument body 1. The pitch bend wheel 10 produces a real time control signal included in the tone production control signal together with the MIDI signal to control the tones produced by an external device including tone generators. Also on the rear surface of the instrument body 1, there are provided a strap ring 7 to be coupled with a hook on the strap belt which is hung around the neck of the player and a cable clamp 11 to be connected with an external cable.

As shown in FIG. 2, there are provided various control manipulators on the rear surface of the instrument body 1. A plurality of setting controls 12a–12d may be adjusting variable resistors for such as a wind gain adjustment, a wind zero (basic wind intensity) adjustment, a lip gain adjustment and a lip zero (neutral bite level) adjustment, and these variable resistors are suitable for setting analog values. Also provided here are DIP (dual in-line package) switches 13 for setting various on/off conditions. The octave designating switches 14 of an on/off type are arranged at the position where the left thumb abuts during performance as shown in the enlarged partial rear view of FIG. 4, and are to be manipulated by the left thumb to change the combination of the on/off states of the switches. The operated conditions of the octave designating switches 13 determine the octave shift amount of the musical note as designated by the note designating switches 3a–3p.

The setup switch 8 is to be manipulated simultaneously or substantially simultaneously with other control manipulators to set various functions. For example, when the pitch bend wheel 10 is manipulated in association with the setup switch, the instrument is set at an audition mode. The audition mode is a mode in which the output from the pitch bend wheel is handled as an breath pressure output and the tones will be produced under the condition that the pitch bend wheel is actuated in place of the wind sensor. Namely, in the audition mode, a trial (test) tone production will be realized by manipulating the non-mouth manipulators such as the pitch bend wheel 10 without operating the mouth manipulators such as the wind sensor and the lip sensor 6. The simultaneous operation of the pitch bend wheel with the octave designating switch 14 will set the wind gain of the wind sensor. Further, the simultaneous operation with the note designating key switches 3 will change the normal outputting channels for the MIDI output in correspondence with the individual key switch depressed. Still further, the pressure value of the wind sensor will be reset to "0" at the moment the setup switch 8 is pressed.

The key hold switch 15 is to keep the played tone sounding continuously. The program change switch 16 is for switching over (selecting) the tone colors of the tone generator. Other than those manipulators, the power switch 17, the power jack 18, MIDI output terminal 19 for outputting the produced musical tone production control signals to an external device such as a tone generator device, the WX output terminal 20 for connecting the tone production control signals to a unique tone generator device and simultaneously receiving a power supply therefrom, and a breath drain 21 for bypassing the breath (air) blown into the mouthpiece 2 and for draining saliva or water.

Referring to FIG. 3 showing the bottom view of the instrument, the construction of the note designating key switches 3 and the key sensor will be described hereinbelow. The key switches 3a–3p are different in shape from one another, but for the convenience sake a single key switch 3 for the illustrative purpose is depicted in FIG. 3. The key switch 3 is of a generally L shape and is rotatably supported above the body 1 by a key shaft 22 inserted through the bent portion of the L shape. A rod 23 is formed by protruding from the front surface of the body 1. The key switch 3 is biased by a spring (not shown) so that the lower surface of the key switch 3 will be normally kept off from the rod 23. When the player depresses the key switch 3, the pressing portion of the key switch 3 will abut the rod 23, and an actuator at the lower end of the rod 23 presses a key sensor provided inside the body 1. The key sensor may be a pressure sensitive sensor of an elastic sheet form of which the resistance value varies in response to the applied pressure. The on/off manipulation condition of the key switch 3 is detected by comparing a voltage at a voltage divider circuit including the key sensor with a reference threshold voltage. Further, the detected voltage value may be utilized to detect the player's finger pressure applied on the key switch 3 so as to realize an after-touch control or else as described later.

Referring to FIG. 4 showing the octave designating switch area in an enlarged scale, an explanation will be made about the shapes and the functions of the octave designating switches 14b–14e. In the case of the illustrated embodiment, a thumb rest 14a is provided on the rear surface of the instrument body 1 along the central axis of the body 1 for the abutment with the left thumb. Adjacent to the thumb rest 14a in its right-up direction are formed octave shift-up switches 14b and 14c close to each other, the switch 14b being of a partly cut-off circle shape and the switch 14c being approximately of a sector shape. Further adjacent to the thumb rest 14a in its right-down direction are formed octave shift-down switches 14d and 14e close to each other, the switch 14d being of a partly cut-off circle shape and the switch 14e being approximately of a sector shape. The shape of the thumb rest 14a is substantially of a circle having a circumference which follows the inner side peripheries of the octave shift-up switches 14b and 14c and of the octave shift-down switches 14d and 14e. These switched are different in shape and position from each other as seen from FIG. 4. The differences given are such that the player can clearly identify which one he/she is touching according to the shape and the position, when the thumb abutting the thumb rest 14a is rotated thereon to successively touch any one of the octave designating switches 14.

When none of the octave designating switches 14b–14e are manipulated, the pitches of the tones produced are respectively those as will be described later with reference to the fingering patterns in FIG. 12, i.e. no octave shift is imparted to the designated standard note pitch. When the octave shift-down switch 14d is actuated alone, the octave level of the produced tone will be shifted downward by one octave. When the octave shift-down switches 14d and 14e are both actuated, the octave level of the produced tone will be shifted downward by two octaves. When the octave shift-down switch 14e is actuated alone, the octave level of the produced tone will be shifted downward by three octaves. Likewise in reverse way, when the octave shift-up switch 14b is actuated alone, the octave level of the produced tone will be shifted upward by one octave. When the octave shift-up switches 14b and 14c are both actuated, the octave level of the produced tone will be shifted upward by two octaves. When the octave shift-up switch 14c is actuated alone, the octave level of the produced tone will be shifted upward by three octaves. Namely, with the depressed state given a value "1" and with the non-depressed state given a value "0", the octave shift switch group including the switches 14b–14e outputs seven levels of the signal value, i.e. −3 through +3. In this way, the octave designating switch group 14 outputs different manipulation information signals successively representing the amount of manipulation on to the switch group 14 according to the movement of the left thumb.

Figure 5:
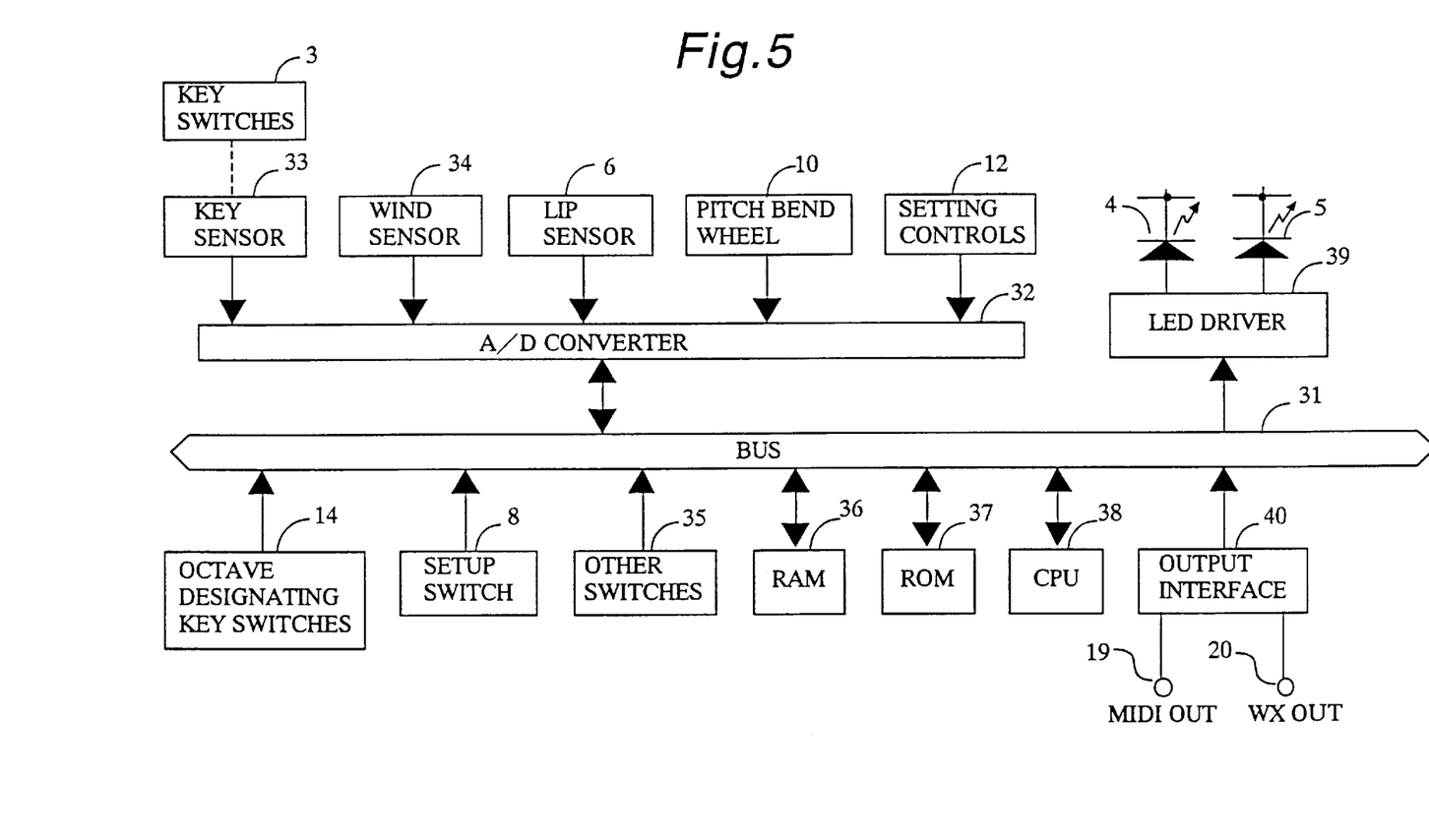
FIG. 5 is a block diagram showing an entire structure of the hardware of an embodiment of an electronic musical instrument of a woodwind style according to this invention.

FIG. 5 is a block diagram illustrating an entire hardware construction of an embodiment of an electronic musical instrument according to this invention. In this Figure, like reference numerals as in FIGS. 1(a), 1(b) and 2 are given like reference numerals to dispense with duplicated explanation. Connected with a bus line 31 are a CPU (central processing unit) 38 having the function of logic operation, a ROM (read only memory) 37 storing various programs, a RAM (random access memory) 36 preparing work areas to be used for the processing by the CPU 38. To the bus 31 are connected various analog inputting manipulators via an A/D converter section 32, such as key sensors 33, a wind sensor 34, the lip sensor 6, the pitch bend wheel 10 and setting controls 12, where the A/D converter section 32 scans the respective analog inputting manipulators to detect the respective analog signals and convert them into digital value signals before supplying to the bus 31. Switch type manipulators connected to the bus 31 are the octave designating switches 14, the setup switch 8, and other switches 35. The key sensor 33 is a pressure sensitive resister exhibiting a resistance value responsive to the depression strength of the key switch 3 as explained with reference to FIG. 3. For example, the key sensor 33 is connected in series with a fixed resister to constitute a voltage divider, to which is applied a predetermined voltage to output a divided analog voltage, which in turn is inputted into the A/D converter section 32. Output sections connected to the bus 31 are an LED driver circuit 39 to control the #1 and #2 LED's 4 and 5, and an output interface 40 for outputting tone production control signals such as MIDI signals. When the programs stored in the ROM 37 are executed by the CPU 38, the associated signal processings take place to output the processed results (tone production control signals) at the MIDI output terminal 19 and at the WX output terminal 20 via an output interface 40. Then an external tone generator and sound system receives the MIDI data signals and produces musical tone waveforms and emits musical sounds. Prior to the manipulation of the instrument for starting a musical performance, various parameters may be set respectively by means of the setting controls 12 such as, for example, variable resisters 12.

When the player manipulates the key switches 3 arranged on the instrument body 1 for designating notes for the performance, the key sensors detects the pressing strengths onto the keys, and then the A/D converter section 32 outputs digitized pressure values and on/off states of the key switches 3. Also the manipulation conditions of the octave designating switches 14 and the setup switch 8 are detected and appear on the bus 31. The CPU 38 accesses these manipulators according to the program stored in the ROM 37 to receive the respective pieces of information and provides tone production control signals based on those pieces of information for outputting from the output interface 40 to the external tone generator.

Figure 6:
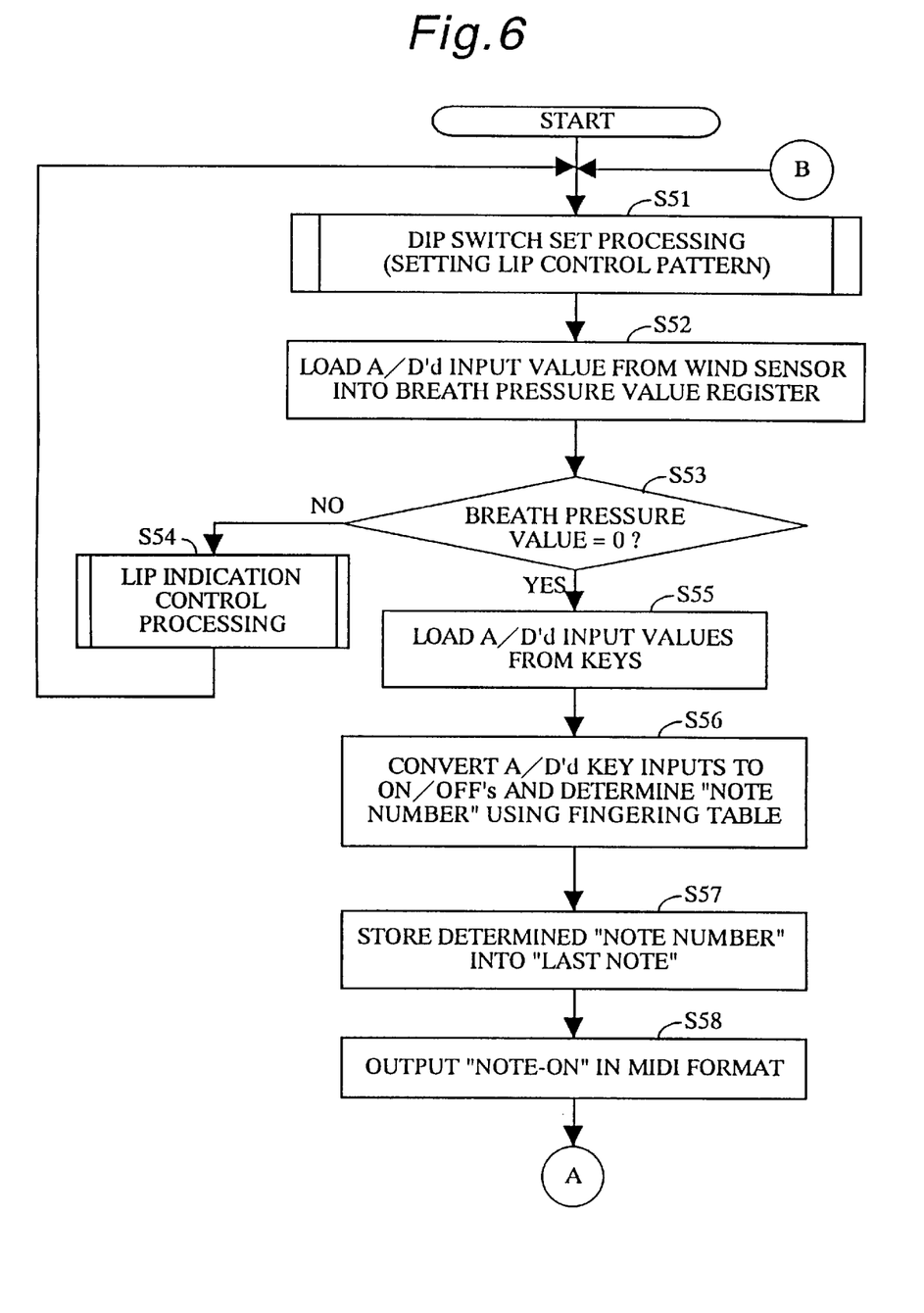
FIG. 6 is a flowchart of a main routine of a tone production control processing which is executed at the start of a tone production in an embodiment of an electronic musical instrument of a woodwind style according to this invention.
Figure 7:
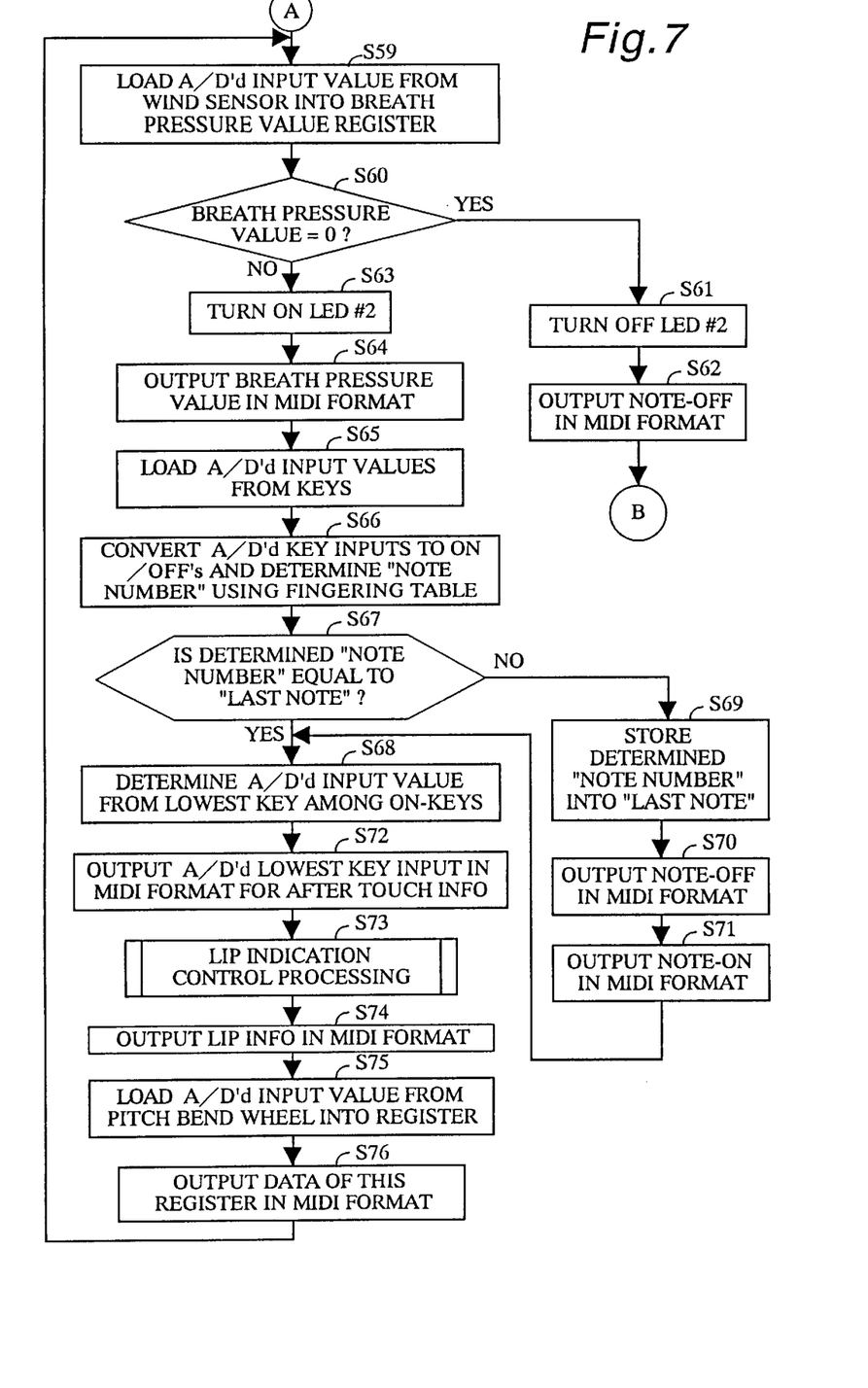
FIG. 7 is a flowchart of a main routine of a tone production control processing which is executed during the continuance of a tone production.
Figure 8:
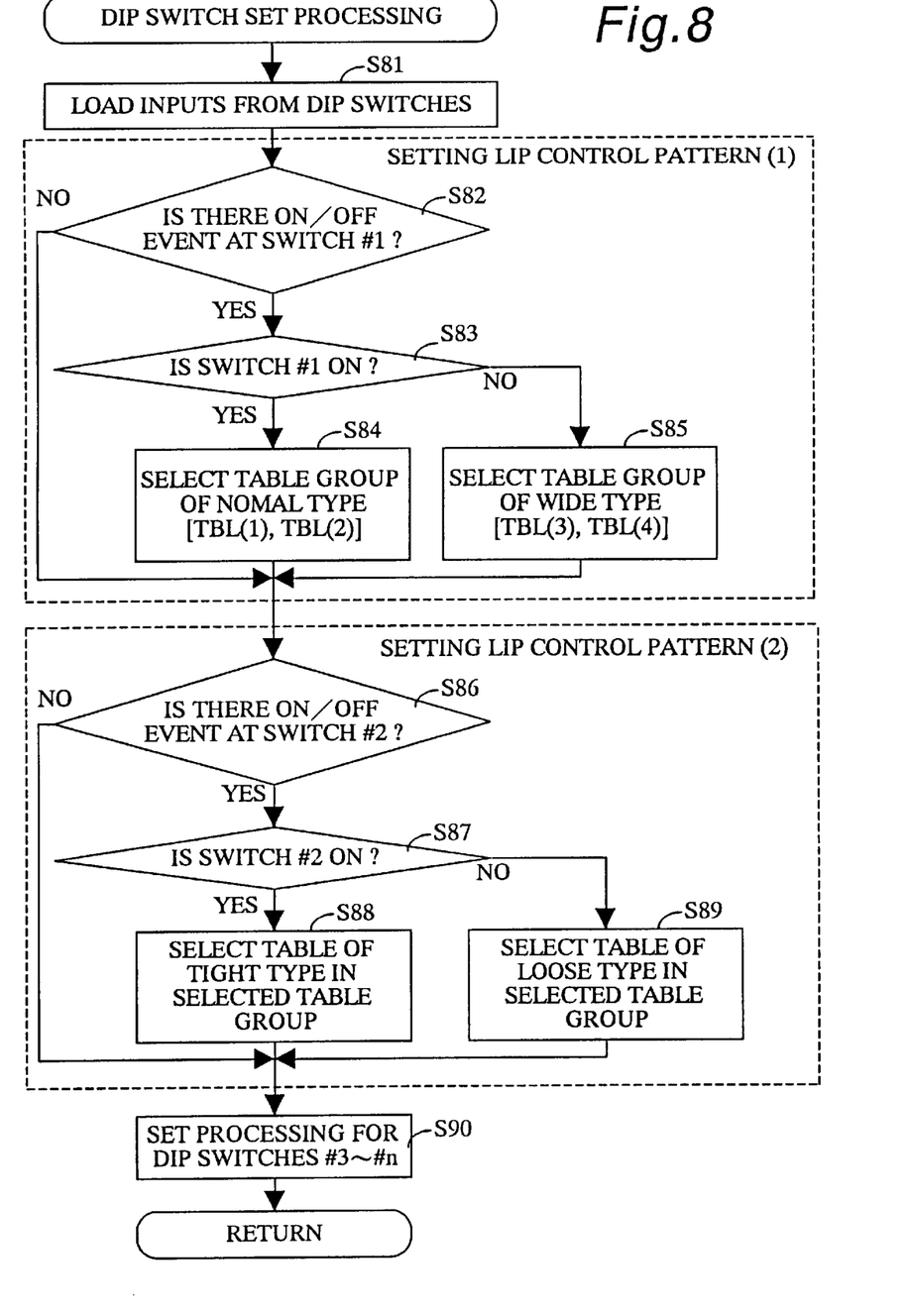
FIG. 8 is a flowchart of a subroutine of a DIP switch set processing executed at step S51 in FIG. 6.
Figure 9:
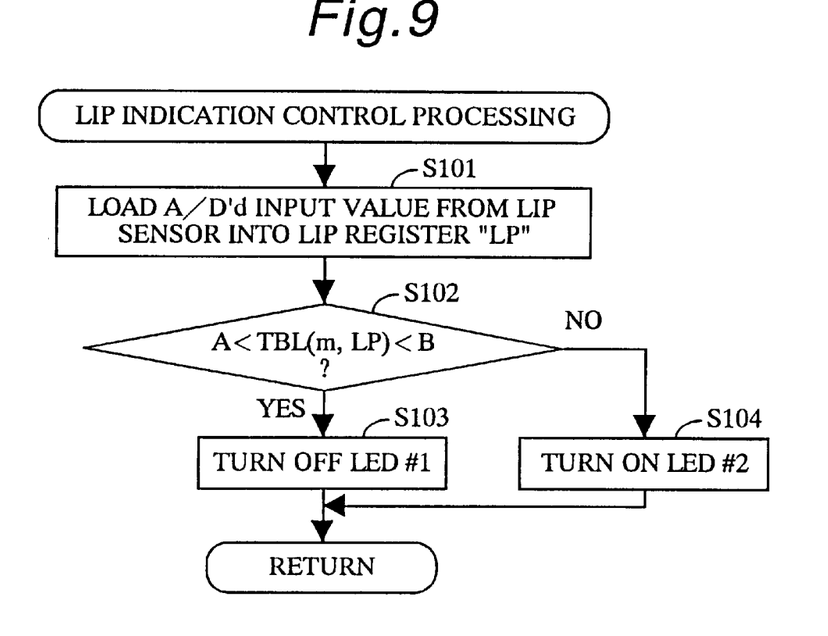
FIG. 9 is a flowchart of a subroutine of a lip indication control processing executed at step S54 in FIG. 6 and step S73 in FIG. 7.
Figure 10:
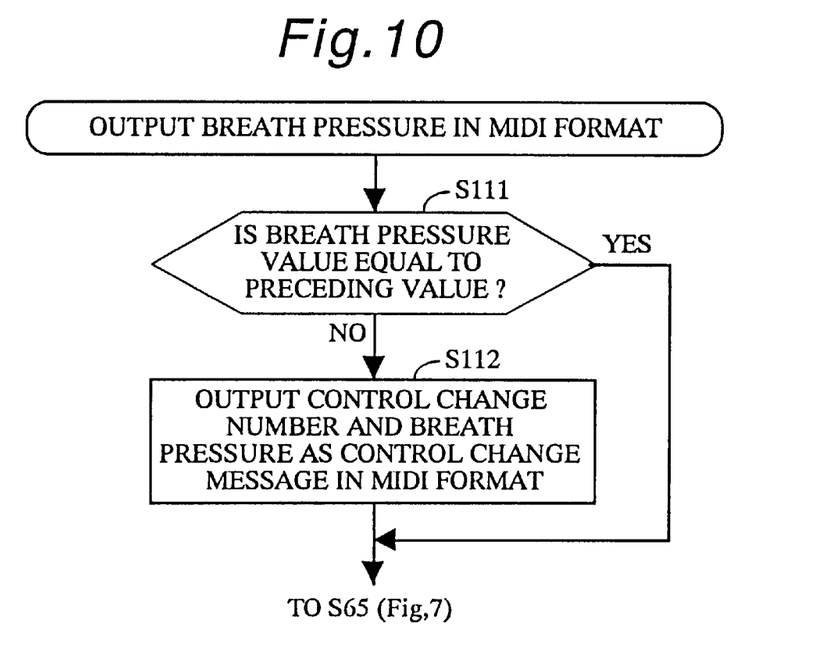
FIG. 10 is a flowchart explaining the details of step S64 in FIG. 7 for outputting breath pressure data in the MIDI format.

FIGS. 6 through 10 are flowcharts describing the operation of an example of the electronic musical instrument of a woodwind style according to this invention. The flowcharts are primarily for the purpose of explaining how the #1 and #2 LED's 4 and 5 function in the invention, and therefore the details of the other processing steps are omitted where such would be understandable for the readers in this technical field. Among these, FIG. 6 is a flowchart of the processing conducted at the start of a tone production in the main routine of the tone production control, FIG. 7 is a flowchart of the processing conducted during the continuance of a tone production in the main routine of the tone production control, FIG. 8 is a flowchart of a subroutine of a DIP switch set processing executed at step S51 in FIG. 6, FIG. 9 is a flowchart of a subroutine of a lip indication control processing executed at step S54 in FIG. 6 and step S73 in FIG. 7, and FIG. 10 is a flowchart explaining the details of a specific example of step S64 in FIG. 7 for outputting breath pressure data in the MIDI format.

In the normal performance mode of operation, the wind sensor 34 controls the operation of tone production. When the player blows breath air into the mouthpiece 2 for the performance and the wind sensor 34 is detecting the breath pressure which is above a predetermined threshold, the instrument outputs tone production control signals including MIDI signals based on the output from the key switches and the output from the wind sensor. While FIGS. 6 and 7 illustrate such an example where the tone production depends on the wind sensor's detection level, an alternative example may be such that the tone production control signals including MIDI signals will be outputted based on the output from the lip sensor 6 and the output from the note key switches, when the lip sensor 6 is detecting the bite strength which is above a predetermined threshold.

Referring to FIG. 6, upon turning on the power switch, the main routine processing initiates. Then, after the regular initialization of the various registers, a step S51 conducts the processing of the DIP switches including the setting of control mode of the lip sensor 6, and then the process moves forward to a step S52. The processing procedure of the step S51 will be explained in more detail with reference to FIG. 8, which is a subroutine flowchart of the step S51. At a step S81, the process is to take in the respective conditions of the DIP switches 13. Steps S82 through S85 are to set a lip control pattern #1 which selectively sets either of a normal type control and a wide type control by means of the first switch among the DIP switches 13. Steps S86 through S89 are to set a lip control pattern #2 which selectively sets either of a tight type control and a loose type control by means of the second switch among the DIP switches 13. A step S90 is a comprehensive expression of various processes for setting various functions and various parameters by means of #3 and further switches among the DIP switches 13, where the operations will be understood by the reader through similar manners as described in connection with #1 or #2 switch. In FIG. 8, the conditions of all the DIP switches 3 are detected at the step S81, but individual condition of each DIP switch 3 may be evaluated separately at the setting of each control pattern (category). Although not shown in the flowcharts, the setting controls (variable resisters) 12c and 12d may be for adjusting the lip gain and the lip zero level, respectively, for example by preparing conversion tables having a basic conversion pattern so that the setting control 12c adjusts the lip zero level (neutral position) and the setting control 12d adjusts the lip gain (conversion gain).

Figure 11:
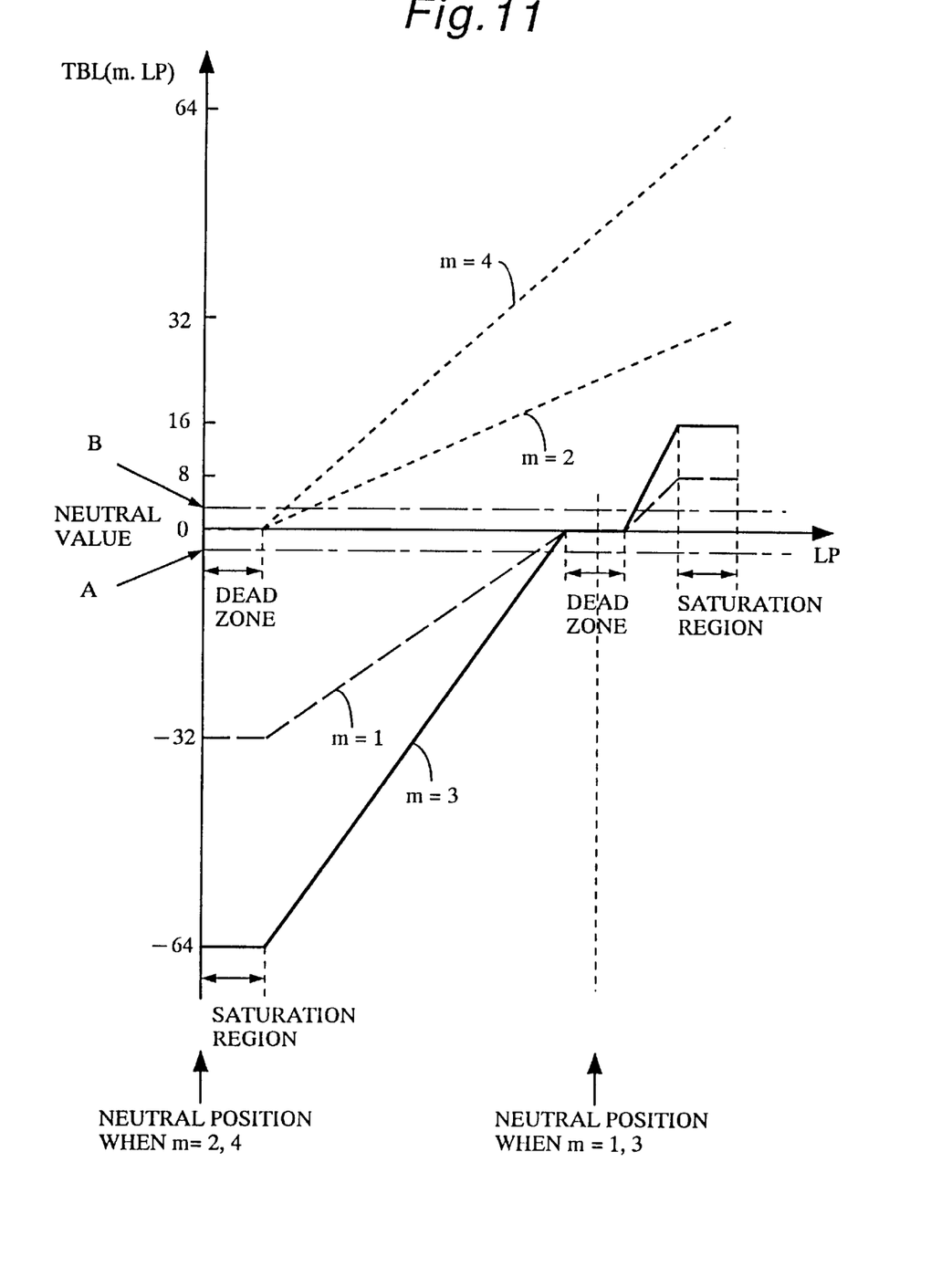
FIG. 11 is a graph showing controlling patterns of the lip sensor in an embodiment of an electronic musical instrument of a woodwind style according to this invention.

Now, an explanation will be made about the controlling patterns of the lip sensor 6, referring to the graph in FIG. 11. The graph shows the relation between the output from the lip sensor 6 and the controlling signal to be used for the tone production. In the Figure, the abscissa is the A/D converted value LP of the output from the lip sensor 6 to be inputted to this conversion process, and the ordinate is the control output value TBL (m,LP) to be outputted from this conversion as the control information. The value of LP is zero (i.e. LP=0) when the lip sensor 6 is at its natural state with no bite strength is applied thereto by the player. The LP value is converted into a control output value according to one of the four conversion tables (i.e. curves in the graph) respectively having parameters m=1, 2, 3 and 4.

The conversion table of m=1 is of a control pattern of tight and normal conditions. The neutral position (lip zero point) is defined at a predetermined middle level of the bite strength applied onto the reed element of the lip sensor 6. In the saturation region where the LP value is zero and its vicinity, the control output value TBL (1,LP) exhibits a negative value "−32". As the value LP increases, the control output value TBL (1,LP) increases accordingly, and in the dead zone provided at the neutral point and its vicinity, the control output value TBL (1,LP) exhibits the neutral value "0". Further, as the value LP increases, the control output value TBL (1,LP) increases again accordingly and reaches a positive maximum value "+8" to saturate thereafter.

The conversion table of m=2 is of a control pattern of loose and normal conditions. The neutral position (lip zero point) is defined at a non-bite state of the reed of the lip sensor 6. In the dead zone where the LP value is zero and its vicinity, the control output value TBL (2,LP) exhibits a value "0". As the value LP increases, the control output value TBL (2,LP) increases accordingly up to a positive maximum value "+32".

The conversion table of m=3 is of a control pattern of tight and wide conditions. The neutral position (lip zero point) is defined at a predetermined middle level of the bite strength applied onto the reed element of the lip sensor 6. In the saturation region where the LP value is zero and its vicinity, the control output value TBL (3,LP) exhibits a negative value "−64". As the value LP increases, the control output value TBL (3,LP) increases accordingly, and in the dead zone provided at the neutral point and its vicinity, the control output value TBL (3,LP) exhibits the neutral value "0". Further, as the value LP increases, the control output value TBL (3,LP) increases again accordingly and reaches a positive maximum value "+16" to saturate thereafter.

The conversion table of m=4 is of a control pattern of loose and wide conditions. The neutral position (lip zero point) is defined at a non-bite state of the reed of the lip sensor 6. In the dead zone where the LP value is zero and its vicinity, the control output value TBL (4,LP) exhibits a value "0". As the value LP increases, the control output value TBL (4,LP) increases accordingly up to a positive maximum value "+64".

While four kinds of conversion tables are illustrated and explained hereinabove in FIG. 11 for m=1 through 4, those are only for the purpose of examples of this invention. Therefore, the width of the dead zones or the saturation regions (as indicated by the arrows), the level of TBL(m,LP) to exhibit in the direction of the ordinate at the dead zones, the range LP covering from the non-bite condition up to the full (strongest) bite condition may be differently provided by preparing further conversion tables labeled with m=5 or more according to the necessity.

Referring to the flowchart of FIG. 8 again, steps for the DIP switch set processing subroutine (S51 in FIG. 6) will be explained in detail hereunder. At the step S81, inputs from the DIP switches are loaded in the work area for data processing. The step S82 is to judge whether there is an on/off event at the switch #1, i.e. whether the switch condition has been changed from the off state to the on state or from the on state to the off state. When there is an on/off event, the process goes forward to the step S83, and when there is not an on/off event the process moves forward to the step S86. At the first execution of this step S82 after the power switch has been turned on, the step S82 is to judge "yes". The step S83 is to select a type of the lip control pattern of the lip sensor 6 to be used for the tone production control according to the condition of the switch #1. When the switch #1 is on, the process moves to the step S84, and when the switch #1 is off, the process moves to the step S85. In the step S84, a table group of normal type [TBL(1), TBL(2)] is selected, and in the step S85, a table group of wide type [TBL(3), TBL(4)] is selected.

The step S86 judges whether there is an on/off event at the switch #2, and directs the processing to go forward to the step S87 when there is a switch #2 event, and to the step S90 when there is no switch #2 event. The step S84 is to determine a type of the lip control pattern of the lip sensor 6 according to the condition of the switch #2. When the switch #2 is on, the process moves to the step S88, and when the switch #2 is off, the process moves to the step S89. The step S88 sets a conversion table of tight type (either m=1 or m=3) from among the tables in the selected group by the step S84 or S85. The step S89 sets a conversion table of loose type (either m=2 or m=4) from among the tables in the selected group by the step S84 or S85. The step S90, although depicted comprehensively for the simplicity's sake, conducts settings of various control patterns and manners according to switches #3 through #n in the DIP switches. Thereafter the process returns to the main routine of FIG. 6 to go forward to a step S52.

Now back to FIG. 6, the step S52 loads A/D converted input values from the wind sensor 35 (in FIG. 5) into a breath pressure value register in the work area. A step 53 judges whether the breath pressure value loaded in the breath pressure value register is "0" or not. If the breath pressure value is not "0", the process moves to a step S54 for a lip indication control processing. If the breath pressure value is "0", the process moves to a step S55.

The subroutine of the step S54 will be described in detail using a flowchart of FIG. 9. The output from the lip sensor 6 (FIGS. 1, 5) is A/D converted by the A/D converter section 32 (FIG. 5), and in a step S101 (FIG. 9) the converted digital value is loaded into a lip register LP as an input value LP to this process. Although not shown specifically in this flowchart of FIG. 9, the LP value from the lip register is inputted to the conversion table of FIG. 11 as determined according to the DIP switch settings to be converted to an intended control pattern (FIG. 11) for the tone production. Then the process move forward to a step S102 to judge whether the output value TBL(m,LP) from the conversion table falls within the range which is greater than A and is less than B in FIG. 11. If the value TBL(m,LP) is in this range, the process goes forward to a step S103, and the value TBL(m, LP) is outside this range, the process goes forward to a step S104. The step S103 is to extinguish the #1 LED 4, while the step S104 is to light this LED. After either of these steps, the process returns to the main routine of FIG. 6. As a result, the #1 LED is lit, when the output value from the lip sensor 6 deviates in either way, above or below, from the range of the neutral (reference) value including its vicinity.

In this way, the player can recognize the neutral level and its vicinity of the manipulation level of the lip sensor 6 by the lit or non-lit condition of the #1 LED 4 according to the output value from the conversion table of the lip sensor detection. Further, the LED will help the player in adjusting the lip zero point by the setting control 12d shown in FIG. 2.

In the above-shown example, the threshold value A is set at a predetermined negative value close to "0" and the threshold value B is set at a a predetermined positive value close to "0". But these values may vary in accordance with the types of conversion tables employed. For example, A may be zero for the loose type control (i.e. m=2, 4), while A and B may be of a larger absolute value for the wide type control (i.e. m=3, 4). As another alternative, the LED #1 may be extinguished when the output value BTL(m,LP) is equal to zero, and may be lit when it is not equal to zero.

Refer back to the main routine of FIG. 6 again. As the lip indication control is a processing under the condition that the breath pressure is not applied to the mouthpiece, the degree of manipulation onto the lip sensor can be confirmed (tested) by means of the lit condition of the #1 LED 4 during the non-sounding state of the instrument. A step S55 is to successively load A/D converted input values from the respective key sensors 33 for the respective key switches 3a through 3p into the work area. A step S56 converts the A/D converted key inputs into respective on/off information. The on/off information thus obtained is used to determine a "note number" with reference to the rules provided in the fingering table (a chart of the fingering patterns is to be explained later with reference to FIG. 12) for the woodwind-styled electronic musical instrument, before the process goes forward to a step S57. The fingering table is stored in the ROM 37 (in FIG. 5) to define the correspondence between the note numbers and on/off combinations established by the note designating key switches 3a–3p according to the rules of the chart of fingering patterns. In case the A/D converted input from the key sensor takes a value from "0" through "10", the value "0" is to denote the "off" state and the values "1" through "10" is to denote the "on" state of the key.

For the simplicity's sake in the Figure, an input processing from the octave designating switches 14 is omitted from the flowchart. But in reality, the manipulation of the octave designating switches 14 will shift the note numbers by the designated amount of octaves. In the step S57, the thus obtained note number is stored in a register "last note". Then the process proceeds to a step S58, which outputs a channel voice message of "note-on" from the MIDI output terminal. The next step is S59 in FIG. 7.

Referring to FIG. 7, the processing about the tone sounding will be explained hereafter. A step S59 is to load the A/D converted input value from the wind sensor 34 into the breath pressure value register, as the step S52 in FIG. 6. Then the process goes to a step S60 to judge whether the breath pressure is equal to "0" or not. If the judgment is "yes", the processing flows to a step S61, and if "no", the processing flows to a step S63. In the step S61, the #2 LED 5 (FIGS. 1, 5) is turned off, and next in a step S62, a channel voice message of "note-off" is outputted in a MIDI format, before returning to the step S51 in FIG. 6. A step S63 turns on the #2 LED 5 (FIGS. 1, 5), and then a step S64 outputs a channel voice message of "control change" which transmits the breath pressure value, before proceeding to a step S65. The player can easily know the extent of the breath pressure necessary for the tone to sound out, i.e. the threshold breath strength for tone production by simply trying to blow into the mouthpiece. An adjustment of the wind zero level (threshold strength for tone sounding) by means of the setting control 12b will also be facilitated.

In the step S65, the A/D converted input values from the respective keys are loaded into the work area, and the respective loaded input values are converted into on/off information to obtain a corresponding note number. The processes conducted in the steps S65 and S66 are the same as the processes conducted in the steps S55 and S56 in FIG. 6. Next in a step S67, a judgment is made as to whether the determined "note number" is equal to the "last note". If the judgment is "yes", the process moves to a step S68, and if "no", the process moves to a step S69. In this context, the "last note" means a note number value stored in the register named as "last note" in the step S57 in FIG. 6 or in the step S69 in FIG. 7.

The situation in which the process moves to the step S69 is where there is a change in manipulation (fingering) of the note designating key switches 3. In the step S69, the determined "note number" (i.e. the note number for a new key-on) is stored in the register "last note". And next, a step S70 outputs a channel voice message of "note-off" in a MIDI format, then a step S71 outputs a channel voice message of "note-on" in a MIDI format, before proceeding to a step S68. The note-off in the step S70 means a note-off event of the "last note" before it is renewed in the step S69. The note-on in the step S71 means a note-on event of the "last note" (note number) after it has been renewed in the step S69, i.e. the note number of the newly key-on'ed note. Speaking musically, the note-on in the step S71 is of a note played in slur as described on a musical score.

The step S68 is to search for the lowest one among the key switches 3 in an "on" condition and get an A/D converted input value from the corresponding key sensor 33, before moving forward to a step S72. Among the plurality of key switches 3a through 3p shown in FIG. 1, the lower side is the direction toward the key switch 3p or the tail of the instrument. According to the fingering patterns in FIG. 12, the lowest key switch in case of playing the note "G" is the key switch 3f. In a step S72, the A/D converted input value from the lowest key switch is made to be an after-touch information, and a channel voice message transmitting this information is outputted in a MIDI format from the MIDI output terminal, before the process goes to a step S73. Using the above-mentioned after-touch information, the tone generator receiving MIDI signals from and being controlled by this instrument can realize any intended after-touch control effects such as vibrato, pitch fluctuation and timbre fluctuation imparted onto the tones in accordance with the after-touch control (pressure variation applied on the depressed keys) by the instrument player. In the above example, the lowest key among the on-keys 3 is used for the after-touch control. It is because the lowest one among the depressed keys are usually most easily controllable by the player. Alternatively, however, any other key may be used for the after-touch control, or the total sum (or average) of all the key sensor values of the depressed key switches may be used as the after-touch control information. Further, each of the key switches 3a through 3p may individually output the after-touch information.

A step S73 is to conduct a lip indication control processing about the lip sensor 6 as in the step S54 in FIG. 6. The detail has already been described with reference to FIG. 9 hereinbefore. Next in a step S74, the output value TBL(m, LP) from the conversion table (FIG. 11) based on the A/D converted input values is made to be lip information, and a channel voice message of "control change" including a control change number previously set by the DIP switch or else is outputted in a MIDI format, before moving to a step S75. The step S75 is to load an A/D converted input value from the pitch bend wheel 10 into the register, and a step S76 adds a control change number which is previously set by the DIP switch or the like to the data in this register to output in a MIDI format, before returning to the step S59. Further, any alternative setting may be made so that some other messages than the channel voice message of "control change", for example, a channel voice message of "pitch bend" should be outputted by the step S76.

FIG. 10 is a flowchart for showing the details of the subroutine of the step S64 in FIG. 7 for outputting a breath pressure in a MIDI format. Although not explained in connection with FIG. 7, the step S64 does not always have to produce a MIDI output signal about the breath pressure, but has to output the breath pressure MIDI signal only when there is a change in breath pressure value. More specifically, a step S111 judges whether the value in the breath pressure register is equal to the preceding value in the breath pressure value register processed in the step S64 or not, and if the judgment is "yes", the process skips to the S65 without outputting the MIDI signal, and if "no", the process of the step S112 will take place. In the step S112, the new breath pressure value and the control change number are outputted as a channel voice message of "control change" in a MIDI format.

The control change number may be set by the DIP switch 13, although not shown in the flowchart of FIG. 7. For example, the breath pressure may be associated with any control object such as the volume of the tones, or may be associated with some controller output such as a breath controller and a food controller. The tone generator section which receives the MIDI signals also receives the control change number and will determine the control object and the controller type, and produces musical tones taking the set values as a specific numerical value of the control object or a specific numerical value of the controller. Which type of controller be allotted to which object to be controlled will be determined at the side of the tone generator section.

As explained supplementally about the MIDI output of the breath pressure using FIG. 10, the processes of outputting the after-touch information at the step S72 in FIG. 7, the lip information at the step S74 and the manipulation information of the pitch bend wheel at the step S75 does not always have to output MIDI signals, but only has to output such information when there is a change in the information.

Figure 12:
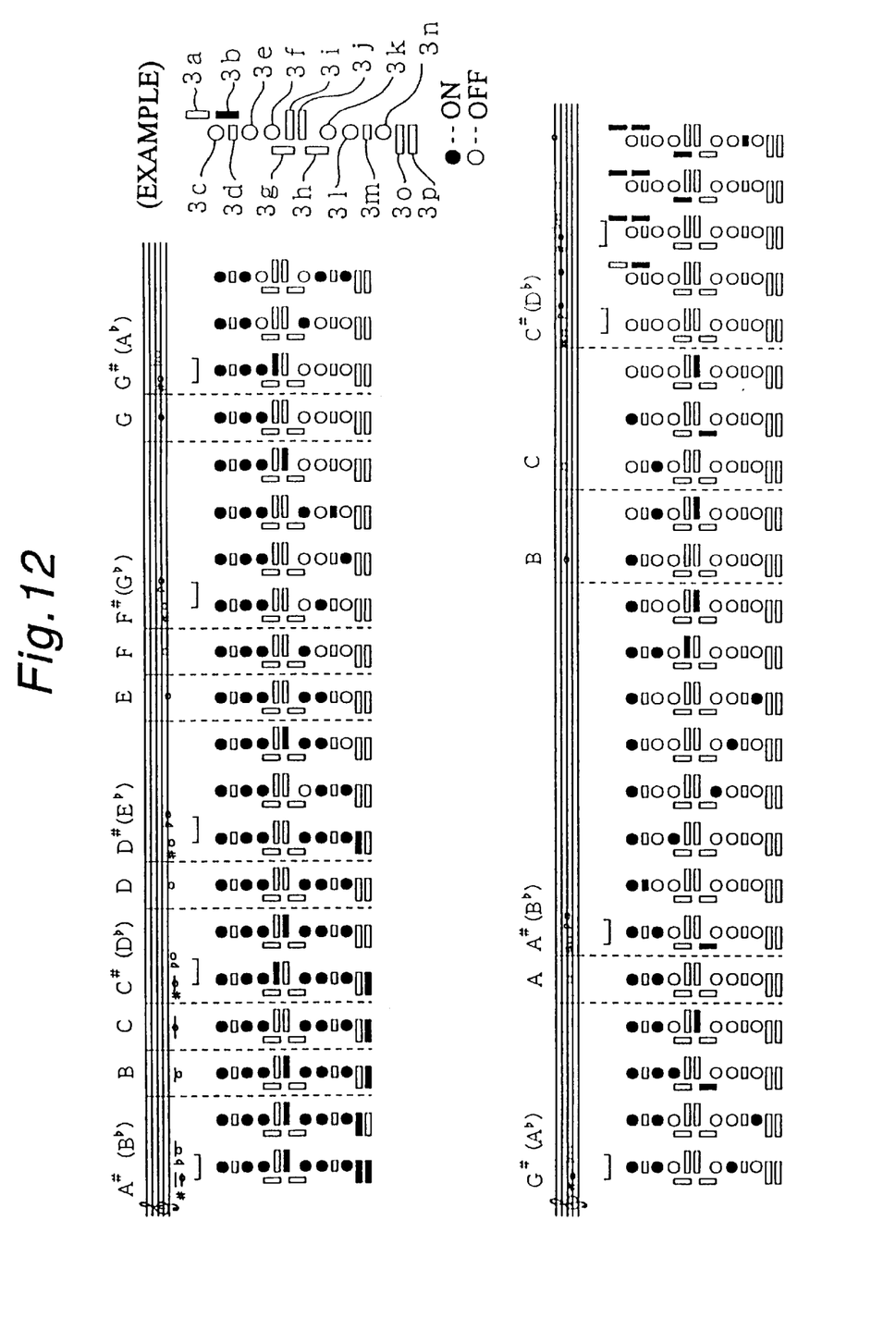
FIG. 12 is a chart showing fingering patterns to be used in an embodiment of the present invention.

FIG. 12 a chart of fingering patterns used for an embodiment of the woodwind-styled electronic musical instrument of this invention. The notes to be produced are determined in accordance with this chart. There is previously stored in the ROM 37 (FIG. 5) a fingering table indicating the correspondence between the on/off combinations of the depressed ones among the note designating key switches 3a through 3p and the note numbers for the tones to be produced. In the Figure, black circles and rectangles indicate the depressed keys to be in the "on" condition, while white circles and rectangles indicate the non-depressed keys to be in the "off" condition. For some of the note pitches, there are several alternative fingering patterns to produce the same pitched note (of the some note number). For example, the note A# can be designated by eight different fingering patterns. This means the different fingering patterns will produce the same note number as long as the patterns are alternatives belonging to the same single note.

In the above description, the indication pattern of the #1 LED 4 is that the lighting manners are different between the case where the control output value TBL(m,LP) takes the neutral region value at the neutral point and its vicinity of the detection output from the lip sensor 6 and the case where the TBL(m,LP) value takes the other value. Consequently, the player can readily know at a glance whether the lip bite strength is in the neutral level region (i.e. the neutral level and its vicinity) or not. Alternatively, the indication pattern of the #1 LED may be that the lighting manners varies in accordance with the A/D converted control input values from the detection output of the lip sensor 6, thereby permitting the player to easily know when the lip bite strength is in the neutral level region.

In the above description, therefore, the first indication manner of the #1 LED 4 is the unlighted state to tell that the reed of the lip sensor 6 is at the neutral position responsive to the control output value TBL(m,LP) of the neutral level, while the second indication manner of the #1 LED 4 is the lighted state to tell that the reed of the lip sensor 6 is not at the neutral position responsive to the control output value TBL(m,LP) of the non-neutral level. Alternatively, the first and the second indication manner can be otherwise as long as the two manners are different each other. Various combinations of the distinguishing states would be employed by those having an ordinary skill in the art.

For example, a second example may be that the first indication manner is the lighted state while the second indication manner is the unlighted state. A third example may be that the first manner is the dim lighted state while the second indication manner is the brightly lighted state. A fourth example may be that the first indication manner is the blinking state while the second indication manner is the continuously lighted state. A fifth example may be that the first indication manner is the green lighted state while the second indication manner is the red lighted state by employing a multi-color light emitting diode unit, with an additional third manner of the unlighted state to tell the power-off of the instrument. In the third through fifth example, the #1 LED 4 takes the role of a power-on indicator. The second indication manner can also be such that the brightness or the color of the LED varies in accordance with or proportional to the level of the control output value TBL(m,LP).

As described above, provision of various conversion tables TBL(m,LP) allows the selective setting of various control patterns in response to the lip bite strength. Other than the tight/loose or wide/normal selection, any other type of selection can be realized by preparing conversion tables having different conversion characteristic curves (graphs) such as a linear function, an exponential function and a logarithmic function, or the extent of existence of the dead zone around the neutral position, or the extent of existence of the saturation region. The selection of these conversion tables may be conducted by means of the combination of the on/off states of a plurality of the switches to pick up a desired one.

While the above described embodiment employs the note designating key switches 3 each of which outputs an analog value signal representing the depression strength, the note designating key switches 3 may be of a mechanical contact type to provide an on/off output signal as in the conventional woodwind styled electronic musical instruments. Also while the above embodiment is provided with only the tone production control part for the whole instrument system and is to be connected to an external device including tone generator circuits via a MIDI cable or a unique WX cable (trade-name), the instrument itself may be equipped with tone generator circuits so that the player can hear the performed musical sounds through a headphone or may be equipped with a loudspeaker so that the musical sounds will be emitted from the instrument body.

The embodiment illustrated in FIGS. 1(*a*) through 3 has an appearance which is very similar to a natural acoustic woodwind musical instrument, but the shape and the configuration of an electronic musical instrument of this invention may not necessarily be limited to such a conventional acoustic instrument-like. Further, the embodiment described employs the note designating manners which are very similar to that of the natural acoustic woodwind instrument, but some other ways may be employed such as on the keyboard type musical instrument.

As will be apparent to those skilled in the art, the woodwind styled electronic musical instrument of this invention is advantageous in that the player of the instrument can readily know at a glance the neutral level of the lip bite strength from the lighted/unlighted state of an LED, which facilitate the delicate control or adjustment of the lip sensor. The light indication is applicable both in the case of the middle bite strength being the neutral level and in the case of the non-bite strength being the neutral level.

While a particular embodiment of the invention has been described, it should be understood, of course, that such is merely for exemplary purposes and that the invention is not limited thereto, since modifications, improvements and combinations may be made by those skilled in the art, particularly in light of the foregoing teachings, without departing from the spirit of the invention. It is therefore contemplated by the appended claims to cover any such modifications that incorporate those features of these improvements in the true spirit and scope of the invention.

What is claimed is:

1. An electronic musical instrument comprising:
   an instrument body provided with a plurality of manipulating note keys arranged thereon for generating note designating information which designates musical notes to be played;
   a mouthpiece arranged at a top end of said instrument body and provided with a bite manipulator for receiving a bite condition of the player and generating bite information;
   a bite indicator for indicating a bite condition of said bite manipulator as operated by an instrument player;
   a musical tone control signal generator for generating a signal which controls production of a musical tone at least in accordance with said note designating information and said bite information; and
   a bite indicator control device which controls said bite indicator to exhibit a first indication state when said bite manipulator is manipulated to or in the vicinity of a neutral level which is a middle extent of the bite degree of said bite manipulator, and to exhibit a second indication state when said bite manipulator is manipulated to a level which is neither said neutral level nor the vicinity thereof.

2. An electronic musical instrument as claimed in claim 1, wherein said first indication state is that said bite indicator is not lit while said second indication state is that said bite indicator is lit.

3. An electronic musical instrument as claimed in claim 1, wherein said musical tone control signal controls production of a musical tone in accordance with said bite information at a selectable control rate.

4. An electronic musical instrument comprising:
   an instrument body provided with a plurality of manipulating note keys arranged thereon for generating note designating information which designates musical notes to be played;
   a mouthpiece arranged at a top end of said instrument body and provided with a bite manipulator for receiving a bite condition of the player and generating bite information;
   a bite indicator for indicating a bite condition of said bite manipulator as operated by an instrument player;
   a musical tone control signal generator for generating a signal which controls production of a musical tone at least in accordance with said note designating information and said bite information;
   an indicator control condition setting device capable of setting at least a first and a second control condition, said first control condition being that said bite information is to exhibit a neutral level when said bite manipulator is manipulated to a middle extent of the bite degree and said second control condition being that said bite information is to exhibit a neutral level when said bite manipulator is manipulated to a substantially zero extent of the bite degree; and
   a bite indicator control device which controls said bite indicator to exhibit a first indication state when said bite information exhibits said neutral level or the vicinity thereof, and to exhibit a second indication state when said bite information exhibits neither said neutral level nor the vicinity thereof.

5. An electronic musical instrument comprising:
   an instrument body provided with a plurality of manipulating note keys arranged thereon for generating note designating information which designates musical notes to be played;
   a mouthpiece arranged at a top end of said instrument body and provided with a bite manipulator for receiving a bite condition of the player and generating bite information;
   a bite indicator for indicating a bite condition of said bite manipulator as operated by an instrument player;
   a musical tone control signal generator for generating a signal which controls production of a musical tone at least in accordance with said note designating information and said bite information; and
   a bite indicator control device which controls said bite indicator to exhibit a first indication state when said bite manipulator is manipulated to or in the vicinity of a neutral level which is a substantially zero extent of the bite degree of said bite manipulator, and to exhibit a second indication state when said bite manipulator is manipulated to a level which is neither said neutral level nor the vicinity thereof;
   wherein said musical tone control signal controls production of a musical tone in accordance with said bite information at a selectable control rate.

* * * * *